May 30, 1967

R. O. GORDON 3,321,909

LIQUID-GAS SYSTEM

Filed April 26, 1965

INVENTOR
RICHARD O. GORDON
BY
ATTORNEY

May 30, 1967  R. O. GORDON  3,321,909
LIQUID-GAS SYSTEM
Filed April 26, 1965  2 Sheets-Sheet 2
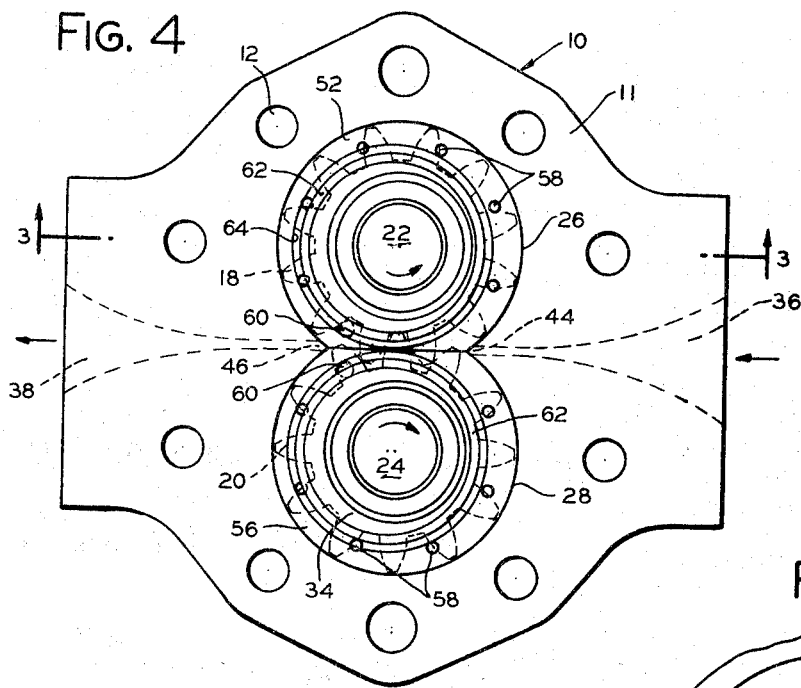
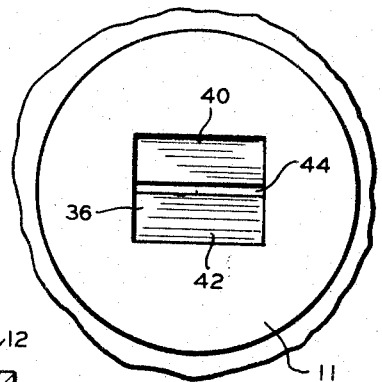
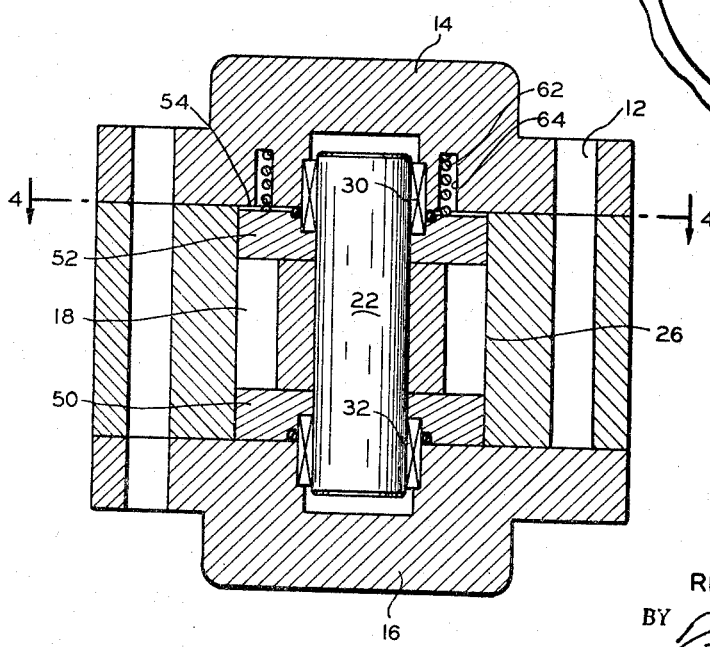
INVENTOR
RICHARD O. GORDON
BY
ATTORNEY

United States Patent Office 3,321,909
Patented May 30, 1967

3,321,909
LIQUID-GAS SYSTEM
Richard O. Gordon, Mequon, Wis., assignor to Clark Equipment Company, a corporation of Michigan
Filed Apr. 26, 1965, Ser. No. 450,978
13 Claims. (Cl. 60—6)

This invention relates to liquid-gas systems, and more particularly to such systems utilizing a gear pump capable of pressurizing both liquid and gaseous fluids, such as hydraulic oil and air.

The invention of my U.S. Patent No. 3,137,238 discloses, among other things, an improved pressure loaded gear pump construction which utilizes a novel pressure gradient compensation system for effecting efficient operation of gear pumps even though a substantial quantity of air is entrained in the fluid being pumped. In my U.S. Patent No. 3,280,756, I have disclosed an invention utilizing in one embodiment a gear pump design which includes a pressure gradient compensation system similar to that covered in my first-mentioned patent, and which combines therewith a restricted inlet and, optionally, outlet conduit design of such a character as to provide a gear pump which has numerous advantages over prior art constructions. Included among the advantages is the capability of the pump to approximately equally distribute between the gears air which may be entrained in the hydraulic fluid being pumped regardless of the positions or attitude of the pump as mounted for operation. Also, my latter pump design effects a substantial reduction of load on the bearings which support the gear shafts by maximizing the length of the pumping path.

In this present invention I provide various fluid systems utilizing a gear pump of a type covered in my Patent 3,280,756, which in the present invention is utilized for pressurizing relatively large quantities of air with the hydraulic fluid being pumped. The pressurized liquid then performs work in a hydraulic portion of the system while the pressurized air is directed to an air operated portion of the system. For example, the pressurized air may be used to pressurize a hydraulic fluid sump in the system, or for supplying compressed air to any connected air operated system, while at the same time the hydraulic portion of the system provides in the usual manner pressurized hydraulic fluid to operate one or more hydraulic devices. In this manner, my invention can be utilized, for example, in combined hydraulic-pneumatic systems in a manner which eliminates the prior necessity of providing a separate air compressor or blower to furnish a source of compressed air. For example, the air side of my system may be used for operating an air brake system on vehicles, and, may even be used to provide a predetermined fuel-air ratio for operating combustion engines. Many other uses of the invention will appear to persons skilled in the art as the description proceeds. It should be understood that the term "air," as used in the description and claims, is intended to include any other suitable gaseous fluid which may be used in systems embodying this invention.

It is a primary object of the present invention to provide a liquid-gas system, such as a hydraulic-pneumatic system, wherein a gear pump is utilized to simultaneously pressurize both the liquid and gas of the system.

Another important object of the invention is to provide an improved hydraulic-pneumatic system for pressurizing both liquid and air for use in the system by means of a single pressurizing device.

Another object of the invention is to provide in a hydraulic-pneumatic system a fluid pressurizing device to which both air and liquid are supplied under certain system operating conditions.

In carrying out my invention I provide a liquid-gas system utilizing a gear pump of improved design, as disclosed and claimed in my Patent 3,280,756, with which is associated valve means for controlling under certain conditions the introduction of air or other gaseous fluid to the pump for the purpose of pressurizing both the liquid and gas flowing in the system, and means for separating the pressurized liquid and gas for use in other devices of the system.

Other objects and advantages of the present invention will become apparent to persons skilled in the art from the following detailed description of my invention taken in conjunction with the accompanying drawings wherein:

FIGURE 3 is a schematized longitudinal sectional view of a gear pump suitable for use in my invention taken along line 3—3 of FIG. 4;

FIGURE 4 is a sectional view taken along line 4—4 of FIG. 3; and

FIGURE 5 is a partial elevational end view taken from the right side of FIG. 4.

Figure 1:
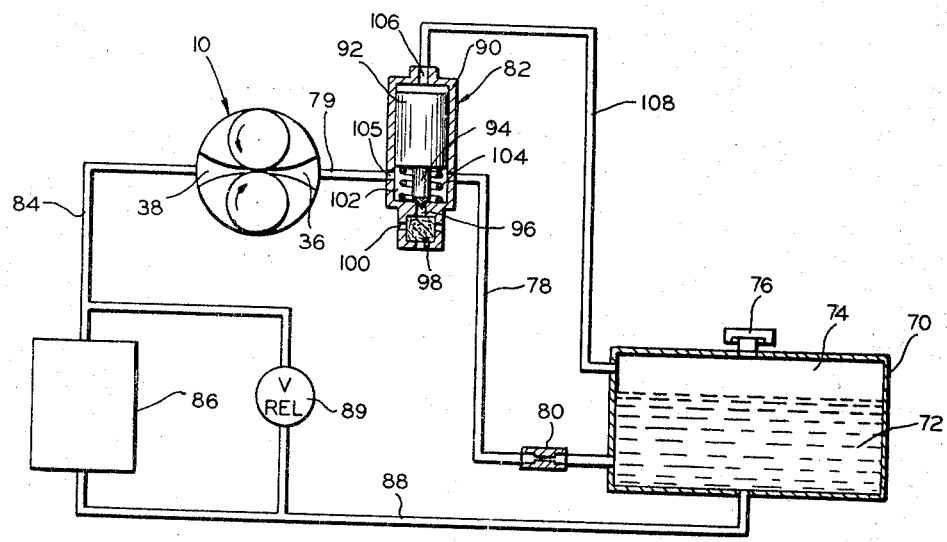
FIGURE 1 is a schematic view of one embodiment of my invention.

Referring first to FIGS. 3–5, there is illustrated one embodiment of the pressure-loaded type gear pump which is disclosed in detail in my Patent 3,280,756, and which is illustrative of the type of pump which I use in my present invention. A gear pump is generally shown at numeral 10 having a housing 11 in which are provided a plurality of bolt openings 12 so that front and rear cover plates 14 and 16 can be securely connected to the housing 10. Intermeshing gears 18 and 20 are secured to shafts 22 and 24 which are supported for rotation in gear chambers 26 and 28. The bearings supporting shaft 22 are shown in FIG. 3 at numerals 30 and 32 and one of the bearings supporting shaft 24 is shown at numeral 34 in FIG. 4. An inlet conduit is provided in the housing at 36 and a discharge conduit at 38. FIG. 5 illustrates a broken-away end view of inlet conduit 36 which is constructed to provide a substantially constant dimension transverse of the gears preferably equal substantially to the width of the gears, while the conduit converges in a vertical direction, as shown, along walls 40 and 42 to provide a narrow transverse slot 44 at the intersection of conduit 36 with the gear chambers. Likewise, discharge conduit 38 forms a narrow transverse slot 46 at the intersection of the conduit with the gear chambers, which slot is preferably substantially equal to the width of the gears. Although FIGS. 4 and 5 illustrate walls 40 and 42 of the inlet conduit, as well as the walls of the discharge conduit, as being of converging unbroken smooth wall construction to provide a streamline flow of fluid, such construction is not necessary in pumps of the type contemplated. It may be found more feasible, for example, to provide a step-like conduit construction to effect the required reduction in conduit cross-sectional area from the end of the housing to the slotted area 44 which communicates with the gear chambers, and it is not intended that the pump conduit construction be restricted to streamline flow characteristics, as shown.

Each of the gears is located intermediate of a pair of thrust plates, one of which is preferably fixed and the other of which is responsive to the fluid pressure gradient in the gear chambers for sealing the side surfaces of the gears. In FIG. 3 fixed thrust plate 50 is located on the one side of gear 18, and floating thrust plate 52 on the opposite side thereof, both of said plates being mounted on shaft 22, and plate 52 forming with cover 14 a motive pressure chamber 54. Likewise, thrust plates similar to plates 50 and 52 are located on opposite sides of gear 20, one of said plates being shown at 56 in FIG.

4. Pressure gradient openings 58 are spaced circumferentially of thrust plates 52 and 56, as shown, from a location near the inlet to a location near the outlet of the pump. The particular location, size and spacing of pressure gradient openings 58 in each thrust plate may be varied to suit requirements, so long as the openings provide communication with the gear pockets, i.e., are located in the thrust plates circumferentially intermediate the root and tip diameters of the gear teeth. A discharge pressure opening 60 is provided in each thrust plate for communicating discharge pressure fluid to the pressure chambers on the top of the thrust plates, e.g., chamber 54 in respect of plate 52, and produces in the pressure chambers, in cooperation with gradient openings 58, a variable pressure condition as required to maintain suitable sealing forces on the side faces of the gears by means of the thrust plates. Other and varied thrust plate constructions can be utilized with this invention, so long as gradient openings, such as openings 58, or other means associated with the thrust plates or housing are utilized for producing in pressure chambers on top of the thrust plates pressure condition which varies continuously in proportion to the pressure gradient in the gear chambers. My Patent 3,137,238 describes in detail those conditions of pump operation which affect pressure gradient, such as whether the pump is pumping solid liquid or liquid with substantial quantities of air entrained therein, whether the fluid being pumped is at relatively high or low temperature, the r.p.m. of the pump, conditions of cavitation, and other factors which affect the pressure gradient in the gear chambers during operation. The above generally described pressure gradient responsive thrust plate structure is preferred, although it is merely exemplary of a number of embodiments of pressure gradient compensating means. Upper and lower springs 62 are retained in a pair of corresponding annular grooves in the cover 14, one of which is shown at 64, for imposing on the pressure plates 52 and 56 an eccentric force in the direction of the discharge conduit 38 so as to impose an initial sealing force on the thrust plates during starting operation.

Inlet conduit 36 is constructed to direct hydraulic fluid, with or without air entrained therein, to slot 44 which is designed to inject relatively high velocity inlet fluid alternately into the gear pockets of the respective gears as the gear teeth rotate out of meshing relation from the vertical or zero degree position thereof to the positions at which the respective gear teeth first mate with the gear chamber wall to provide with the next adjacent gear tooth a substantially closed gear pocket, all as described in detail in my Patent 3,280,756. Thus, the gear pockets are filled alternately with air entrained liquid, in the usual case, so that an approximately equal division of the entrained air is effected as between the pockets of the respective gears.

The principles employed in my basic pressure gradient pump construction utilizing communicating pressure gradient openings 58 are set forth in full in my Patent 3,137,238, whereas the principles of operation of my pump construction shown somewhat schematically in FIGS. 3 4 and 5, including particularly the converging inlet and discharge conduit construction, are set forth in full in my Patent 3,280,756; further detailed discussion of the theory and operation of the pump structure per se, is not, therefore, required herein. Suffice it to state that the above-described gear pump, which comprises a part of the present invention, enjoys a number of significant advantages over prior art pump structures which include, among others, (1) approximately equal distribution of the air entrained in liquid being pumped as between the gears, regardless of the position or attitude of mounting of the pump; (2) distribution of liquid substantially equally to both gears when the pump cavitates; (3) inherent approximate hydraulic balance of the thrust plates with a minimum area of unbalance adjacent the inlet such that masking off of areas of the thrust plates adjacent the inlet is not required; (4) minimum turbulence adjacent both the inlet to and discharge from the gear chambers; and (5) reduction of load on the bearings which support the gear shafts by maximizing the length of the pumping path in the gear chambers.

I have discovered, contrary to the prior art, that the ability of the above-described pump construction to readily pump hydraulic fluid containing large quantities of entrained air without significantly affecting the longevity of the pump or the efficiency of its operation, enables the pump to be used in hydraulic-pneumatic systems as a device for simultaneously pressurizing for separate use in the systems both liquid and air, thus eliminating the need for separate air compressors, and the like, and providing an extremely simple and low cost device for pressurizing two different mediums simultaneously.

Referring now to FIG. 1, pump 10 comprises the pressurizing device in a hydraulic system utilizing an air pressurized reservoir 70 containing a volume of oil 72 and a volume of air 74 controlled to be maintained at, say 5 p.s.i. A pressurized cap and relief valve 76 contains the air in the sump at 5 p.s.i, and acts as a relief valve in the event the pressure exceeds said pressure. Oil reservoirs in systems of this kind are normally pressurized primarily to prevent air flow in or out of the tank when hydraulic cylinders of the system, for example, extend and retract. Pressurizing the reservoir prevents dirt from being drawn into the tank when a hydraulic cylinder extends, for example. Pump inlet 36 is connected to the reservoir by a conduit 78, a restriction 80 and an air control valve 82; discharge conduit 38 is connected to the reservoir by way of a conduit 84, a hydraulic device 86, such as a hydraulic cylinder or the like, and a conduit 88. A relief valve 89 is provided for bypassing fluid around hydraulic device 86 in the event of excessive pressure in conduit 84. Air control valve 82 comprises a cylindrical housing 90 in which is located a reciprocal piston valve 92 including a valve element 94 controlling an air port 96 in cylinder 90. An air filter 98 is connected to the cylinder 90 and includes one or more air bleeds 100 which communicate atmosphere air to port 96. In valve chamber 102 is located a spring 104 which urges piston valve 92 in a valve opening direction, cylinder 90 being connected by continuously open ports 105 to conduits 78 and 79, and said cylinder also including a port 106 which connects the upper end of the cylinder with air space 74 by way of a conduit 108.

In operation, pump 10 provides pressure liquid to hydraulic device 86 which performs its particular function and discharges low pressure liquid back to reservoir 70 through conduit 88. The spring 104 actuates valve 94 to open air port 96 whenever the air pressure in the reservoir decreases to, say, 3 p.s.i., it being understood that said air pressure acts on the top of piston valve 92 to urge the valve closed. When the piston valve opens, air is drawn into chamber 102, mixes with the liquid flowing therethrough to the pump, and is pressurized along with the liquid supplied to device 86. The air remains entrained in the liquid which flows to the sump, wherein the entrained air separates from the liquid to increase the air pressure in air volume 74 until piston valve 92 closes port 96, whereupon no further air is introduced in the system until the air pressure again decreases to said lower pressure. It will be noted that the liquid pressure in conduits 78 and 79 is less than atmospheric because of the restriction 80 upstream of valve 82 in conduit 78. The effect of restriction 80, combined with the velocity of fluid flowing in conduits 78 and 79 to the restricted pump inlet 36, always effects a less than atmospheric fluid pressure in chamber 102, so that whenever valve element 94 opens port 96, atmospheric air flows into chamber 102. Thus, reservoir 70 may be pressurized by means of pump 10 in a hydraulic system wherein no separate air pressurizing device is required for this purpose.

Figure 2:
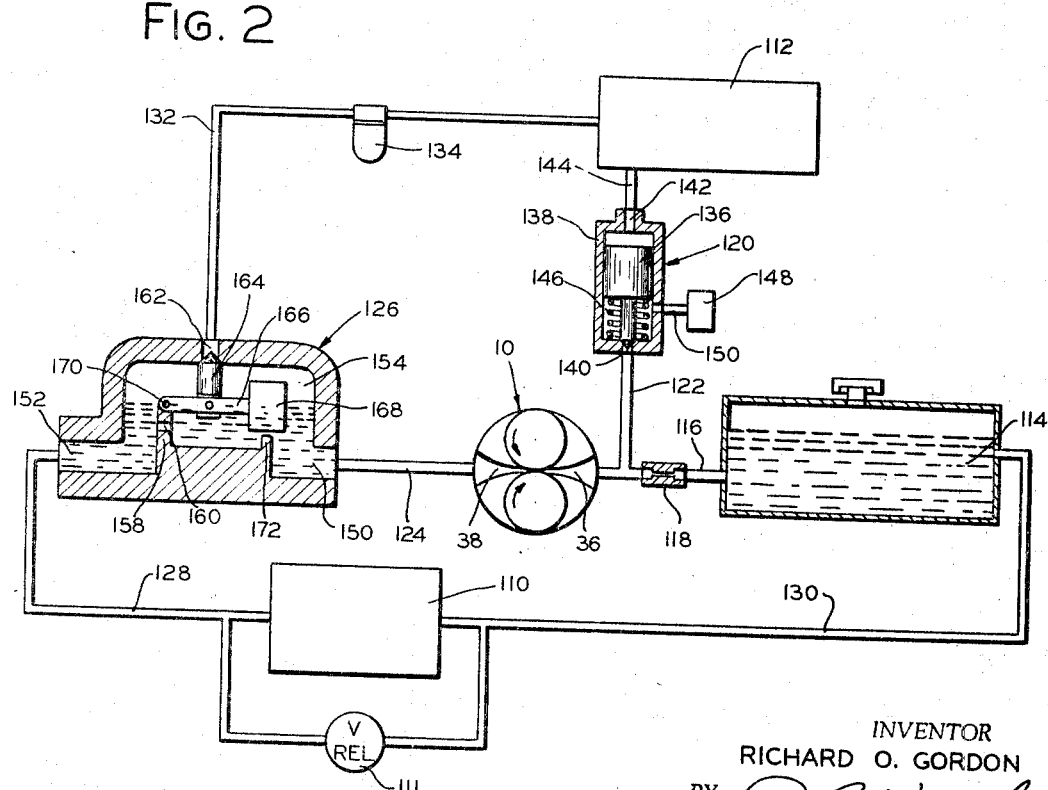
FIGURE 2 is a schematic view of a second embodiment of my invention.

Referring now to the second exemplary embodiment of my invention which is shown in FIG. 2, pump 10 is utilized to provide both pressurized liquid to a hydraulic device 110 and to provide simultaneously pressurized air to, for example, an air pressure operated brake system 112 on a vehicle with which the FIG. 2 system may be utilized. A relief valve 111 is provided for bypassing fluid around hydraulic device 110 in the event of excessive pressure in conduit 128. It will be understood that many different embodiments and applications of my invention are clearly within its scope, and that reference to specific system elements or devices herein is intended to be exemplary only, and not limitative. In the FIG. 2 embodiment I mention an air brake system in respect of device 112 as being representative of a hydraulic-pneumatic system wherein the air operated brake requires an intermediate level of air pressure. Air brakes of the type contemplated, for example, require about 100 to 120 p.s.i. The reservoir 114, which may or may not be pressurized, as desired, supplies operating liquid to pump 10 by way of conduit 116 and a restriction 118. Pump 10 also receives inlet pressure air, as required, by way of an air control valve 120 and conduit 122. The pump pressurizes and directs both the liquid and entrained air to the condit 124 which is connected to an air separator device 126, the liquid then flowing to hydraulic device 110 and thence to the sump by way of conduits 128 and 130, and the previously entrained air being separated from the liquid in separator 126 and flowing to the air operated brake system 112 by way of conduit 132 and an oil separator 134.

Air control valve 120 is similar to air control valve 82 in FIG. 1; it includes a piston valve 136 reciprocable in cylinder 138 which is connected at its one end to conduit 122 by way of a port 140 and at its other end to the air brake system by way of a port 142 and conduit 144. A spring 146 urges valve 136 to an open position, and an air filter 148 is connected to the atmosphere and filters the air flow to cylinder 138 by a passage 150.

Separator 126 has an inlet port 150 and an outlet port 152 connected by means of an air-oil chamber 154 in which is located a baffle plate 158 for causing the air to be separated from the oil as the oil passes through the chamber and baffle plate. A plurality of openings 160 are provided in the baffle plate. An air vent 162 is located at the top of the separator and is controlled by an air separator float valve 164 which is mounted on a float arm 166 connected at its end to a float member 168 which rises and falls with changes in level of the liquid in the separator, arm 166 being pivoted at 170 to the upper end of baffle 158.

Operation of the system of FIG. 2 is similar to the operation of the system of FIG. 1 in that air piston valve 136 functions in a manner similar to air piston valve 92, except that spring 146 is a much heavier spring than spring 104 inasmuch as the air operated brakes 112 are adapted to function at a much higher air pressure than the air portion of the system of FIG. 1. Whenever the air in brake 112 drops below a predetermined operating pressure, spring 146 opens valve 136 and permits air to flow through filter 148 to the inlet of pump 10 by way of port 140 and conduits 122 and 116, restriction 118 operating as in FIG. 1 to assure a suction pressure in conduit 116 between the restriction and inlet 36 of the pump. A valve stop 172 in the separator unit limits downward movement of float 168 so that valve 164 opens port 162 a limited amount when the oil level in the separator unit drops. Pressure liquid may, of course, be flowing continuously during operation through the separator unit to the hydraulic unit 110, it being understood that there is no interruption of liquid flow to unit 110 because of the interposition of the air separator in conduits 124 and 128. Whenever air device 112 reaches its operating pressure, air supply valve 136 closes which, in turn, causes the liquid level in the separator to rise closing control valve 164 until such time as the air pressure in device 112 reaches a predetermined low value at which valve 136 again opens to permit air to be introduced in the system. It is understood that air device 112 includes an air reservoir which is connected to conduit 132 so that the supply of pressurized air operating the device is of considerable volume. Thus, the air valves 136 and 164 need not operate too frequently to replenish the air reservoir.

It should be understood that, depending upon the discharge pressure which the pump 10 is designed to generate, the pump may be used in high pressure hydraulic-air systems wherein both liquid and air may be required at pressures up to, say, 2000 p.s.i. The same type of system as is shown in FIG. 2 may be used in either high or intermediate pressure systems, with suitable adjustments, of course, in the system components to utilize and control the pressures required. It is again emphasized that the above particularly described system embodiments are exemplary only, and that my invention is subject to being adapted for use in many different ways, as will be clearly apparent to persons skilled in the art. It is important to understand that the simultaneous pressurization of liquid and air, or other gas, in a gear pump for subsequent separation thereof and use of each fluid medium in different ways, has not heretofore been possible in the art. I am able to effect this extremely novel result because of the utilization of a gear pump structure which is specifically designed to operate with normal efficiency and longevity even though air is purposely introduced into the pump in volumes up to, say, 40% by volume of the total fluid passing therethrough. This has, prior to the invention disclosed in my above-mentioned co-pending application, been considered unacceptable in gear pump design.

Although only two system embodiments of my invention have been particularly described herein, the disclosure hereof is primarily for the purpose of illustration and not as a limitation on the scope of the invention. It is therefore to be expressly understood that the invention is not limited to the embodiments disclosed, but that various modifications may be made to suit different requirements and that other changes, substitutions, additions and omissions may be made in the construction, arrangement and manner of operation of the components without necessarily departing from the scope of the invention as defined in the following claims.

I claim:

1. A fluid pressure system including gear pump means constructed in a manner to pressurize simultaneously liquid and gaseous fluids, liquid pressure operated means connected to the pump, gas pressure operated means connected to the pump, and means responsive to a pump generated gas pressure for controlling the volume of gas introduced into the inlet of the pump.

2. A fluid pressurizing system including a gear pump having a pair of meshing gears, an outlet conduit, an inlet conduit formed to provide a reduction in flow area in the direction of fluid flowing such that the exit area of the inlet conduit injects fluid of approximately equal density alternately into the gear pocket of the respective gears, and thrust plate means constructed to be responsive simultaneously to a plurality of pump generated pressures for sealing the adjacent side faces of the gears, liquid pressure operated means connected to the outlet conduit, gas pressure operated means connected to the outlet conduit, and means responsive to gas pressure generated by the pump for introducing additional quantities of said gas into said inlet conduit.

3. A fluid pressure system including gear pump means constructed in a manner to pressurize simultaneously liquid and gaseous fluids, liquid pressure operated means connected to the pump, gas pressure means connected to the pump, means responsive to a pump generated gas pressure for introducing into the inlet to the pump said gaseous fluid, and means connected to the gear pump for separating said liquid and gaseous fluids.

4. A fluid pressure system including gear pump means having a restricted inlet conduit and pressure gradient compensating means constructed such that the pump pressurizes simultaneously liquid and gaseous fluids for use in separate liquid and gas operated means, means for controlling a flow of gas to the inlet of the gear pump, and means for separating the mixed liquid and gas pressurized fluid discharged by the pump.

5. A hydraulic-pneumatic pressurizing system including gear pump means constructed in a manner to pressurize simultaneously hydraulic fluid and air, hydraulic fluid pressure operated means connected to the discharge of the pump, air pressure operated means connected to the discharge of the pump, and means connected to the inlet of the pump for communicating controlled quantities of air thereto.

6. A fluid pressure system as claimed in claim 5 wherein separator means is connected to the discharge of the pump for separating the mixed hydraulic fluid and air flowing from the pump.

7. A fluid pressure system as claimed in claim 5 wherein said latter means comprises valve means responsive to a pump generated air pressure.

8. A fluid pressure system as claimed in claim 5 wherein a flow restriction is located in the inlet conduit upstream of the connection thereto of said last-mentioned means.

9. A fluid pressure system including gear pump means constructed in a manner to pressurize simultaneously liquid and air, liquid operated means connected to the discharge of the pump, air operated means connected to the discharge of the pump, and separator means connected to the discharge of the pump for separating the liquid and air and directing each said fluid to the respective liquid and air operated means.

10. A fluid pressure system including gear pump means constructed in a manner to pressurize simultaneously liquid and air, liquid operated means connected to the outlet of the pump, air operated means connected to the outlet of the pump, and means connected to the inlet of the pump responsive to a pump generated air pressure for controlling the quantity of air flowing to the pump inlet.

11. A fluid pressure system as claimed in claim 10 wherein a flow restriction is located in the inlet to the gear pump intermediate a liquid reservoir and the connection of said air pressure responsive means to the inlet.

12. A fluid pressure system including gear pump means constructed in a manner to pressurize simultaneously liquid and air, liquid pressure operated means connected to the pump, air pressure operated means connected to the pump, separator means connected to the pump for separating and directing the fluid mixture flowing thereto to the respective liquid and air operated means, valve means connected to the inlet of the pump responsive to a pump generated air pressure for controlling a flow of air to the inlet of the pump as a function of said air pressure, and a flow restriction connected to the inlet upstream of the connection of said valve means thereto.

13. A fluid pressure system including gear pump means constructed in a manner to pressurize simultaneously liquid and air, an air pressurized liquid reservoir connected to the inlet of the pump, liquid pressure operated means connected to the outlet of the pump, and air pressure operated means connected to the inlet of the pump and to said reservoir for controlling a flow of air to the inlet of the pump as a function of the air pressure in the reservoir.

References Cited

UNITED STATES PATENTS

| | | | |
|---|---|---|---|
| 732,908 | 7/1903 | Thomson. | |
| 2,935,078 | 5/1960 | Greenland et al. | 137—202 X |
| 3,137,137 | 6/1964 | Kalle | 60—52 |
| 3,242,867 | 3/1966 | Mosbacher | 103—6 |

EDGAR W. GEOGHEGAN, *Primary Examiner.*